US006779153B1

(12) United States Patent
Kagle

(10) Patent No.: US 6,779,153 B1
(45) Date of Patent: Aug. 17, 2004

(54) CREATION OF WEB PAGES THROUGH SYNCHRONIZATION

(75) Inventor: Jonathan Kagle, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/300,141

(22) Filed: Apr. 27, 1999

Related U.S. Application Data

(60) Provisional application No. 60/111,999, filed on Dec. 11, 1998.

(51) Int. Cl.$^7$ .............................................. G06F 17/21

(52) U.S. Cl. ..................... 715/522; 715/517; 715/530; 715/513; 715/501.1

(58) Field of Search ................................ 707/513, 522; 709/218; 715/522, 501.1, 513, 517, 523, 530, 531; 345/751, 733

(56) References Cited

U.S. PATENT DOCUMENTS

| | | | |
|---|---|---|---|
| 5,845,299 A | | 12/1998 | Arora et al. |
| 5,864,338 A | * | 1/1999 | Nestor et al. ............... 345/866 |
| 5,893,127 A | | 4/1999 | Tyan et al. |
| 5,898,836 A | | 4/1999 | Freivald et al. |
| 5,937,418 A | | 8/1999 | Ferris et al. |
| 5,966,535 A | | 10/1999 | Benedikt et al. |
| 6,021,426 A | | 2/2000 | Douglis et al. ............. 709/200 |
| 6,026,433 A | * | 2/2000 | D'Arlach et al. ............. 707/10 |
| 6,035,323 A | * | 3/2000 | Narayen et al. ......... 707/501.1 |
| 6,112,242 A | | 8/2000 | Jois et al. |
| 6,122,661 A | | 9/2000 | Stedman et al. |
| 6,141,666 A | * | 10/2000 | Tobin .......................... 705/27 |
| 6,185,587 B1 | | 2/2001 | Bernardo et al. |

(List continued on next page.)

OTHER PUBLICATIONS

Lemay "Teach Yourself Web Publishing with HTML in 14 days", 1995, pp. 381–391.*
Mack et al., "HTML 4.0 No Experience Required", 1997, pp. 542–546.*
Rodenthal, Adobe SiteMill 1.0: Site Managment Made Easy, Internet 1998, pp. 1–2.
Lemay, Teach Yourself Web Publishing with HTML 3.0 in a Week, Sams.net Publishing 1996, pp. 46–47.
Adams et al., "Template Style Considerations for Sea–of–Gates Layout Generation", 26$^{th}$ ACM/IEEE Design Automation Conference®, pp. 31–36, 1989.
Fernández et al., "Catching the Boat with Strudel: Experiences with a Web–Site Mangement System", pp. 414–425, 1998.

*Primary Examiner*—Stephen S. Hong
(74) *Attorney, Agent, or Firm*—Banner & Witcoff, Ltd.

(57) ABSTRACT

Creation of web pages on hand-held devices such as digital cameras and personal digital assistants (PDAs) is made feasible by a system for generating mark-up language based on a compact template mapping file created on the hand-held device. Through a user interface, a user of the hand-held device creates the template mapping file, which associates a selected on of the templates stored on the host computer with one or more source files, which may include text, image and audio files. HTML templates (files containing the actual and usually lengthy formatting commands that accomplish the style selected by the user) and other large files needed to create compelling web pages reside on the host computer, not on the hand-held device. In a synchronization operation, where the hand-held computer is operably connected to the host computer, the source files are merged with the selected style templates according to mapping information in the template mapping file. The invention is especially applicable to digital cameras having features of a PDA and provides users with the capability to remotely create their own websites which incorporate images they have obtained with the digital camera.

57 Claims, 8 Drawing Sheets

U.S. PATENT DOCUMENTS

| | | |
|---|---|---|
| 6,192,363 B1 | 2/2001 | Yasumura |
| 6,195,681 B1 | 2/2001 | Appleman et al. |
| 6,199,082 B1 | 3/2001 | Ferrel et al. |
| 6,223,190 B1 * | 4/2001 | Aihara et al. ............... 348/207 |
| 6,253,228 B1 | 6/2001 | Ferris et al. |
| 6,304,886 B1 * | 10/2001 | Bernardo et al. ........... 707/517 |
| 6,313,835 B1 | 11/2001 | Gever et al. |
| 6,324,521 B1 | 11/2001 | Shiota et al. ................. 705/27 |
| 6,330,575 B1 | 12/2001 | Moore et al. |
| 6,336,210 B1 | 1/2002 | Taima et al. |
| 6,344,853 B1 * | 2/2002 | Knight ...................... 345/629 |
| 6,397,387 B1 | 5/2002 | Rosin et al. |
| 6,429,880 B2 | 8/2002 | Marcos et al. |
| 6,449,260 B1 | 9/2002 | Sassin et al. |
| 6,466,970 B1 | 10/2002 | Lee et al. |

\* cited by examiner

CREATION OF WEB PAGES THROUGH SYNCHRONIZATION

This application receives the benefit of U.S. Provisional Application No. 60/111,999, filed Dec. 11, 1998.

TECHNICAL FIELD

The invention relates to systems and methods for generating web pages to be displayed on distributed networks, such as the World Wide Web. More particularly, the invention relates to systems and methods for providing users of a hand-held device, such as a personal digital assistant (PDA) or digital camera, with the capability to author web pages without being limited by the system resources of the hand-held device.

BACKGROUND OF THE INVENTION

The distributed network known as the Internet is a global array of cooperatively interconnected computer networks. It includes the World Wide Web, which is a collection of websites defined by web servers—computers that store and retrieve computer files that represent web pages that are requested by and displayed to users of the Internet. Web pages combine text, graphic images, animation, audio and other multimedia forms for presentation to viewers. In the Web environment, client machines communicate with Web servers using Hypertext Transfer Protocol (HTTP), which uses a standard page description language known as Hypertext Markup Language (HTML). HTML provides basic document formatting and allows the developer to specify "links" to other servers and files.

It is known to provide web page authoring tools, such as "FRONTPAGE" and "FRONTPAGE EXPRESS" developed by Microsoft Corporation of Redmond Wash., which give web page authors the ability to quickly and efficiently create compelling web pages. Much of the power of these tools is derived from the use of style templates, which contain predefined HTML formatting commands for predetermined styles. With templates, a web page author avoids the tedious task of manually entering hundreds of HTML formatting commands. Because of the need to store large libraries of templates and other large files, such as background bitmaps, state-of-the-art web-authoring tools require computer platforms with relatively large amounts of system resources, i.e. memory.

There is a recent growing trend towards the use of portable hand-held computing devices that offer portability, but which provide somewhat limited computing features. Known hand-held devices, such as PDAs, provide for the storage and retrieval addresses and other information, sending and receiving of e-mail via communications link and other functionality defined by resident software applications. PDAs offer the capability of remote connectivity to a desktop computer or to the Internet using a communications link, enabling users to upload and download information, and to synchronize information stored in the PDA with information on a host computer, from virtually any geographic location. Hand-held devices also include rather specialized platforms, such as digital cameras, which provide users with the capability of instantly recording electronic images on a removable storage device, such as a floppy diskette, for later viewing on a desktop computer. From the desktop computer, users may send the image files to their friends via e-mail, post them to an existing website on the World Wide Web, or incorporate them into their own website. As the user interfaces and features of digital cameras become more sophisticated, they may tend to incorporate much of the functionality of PDAs One consequence of the compact designs and low weights consumers desire in hand-held electronic devices is that such devices are limited in the amount of system resources, namely memory and screen size, that they provide. Although the portability of hand-held devices make them attractive as web-authoring platforms, they have not heretofore been considered as feasible platforms for web creation, primarily because of their limited system resources. It would therefore be desirable to provide a web-authoring system and method which are suitable for implementation on a hand-held device, such as a PDA or a digital camera. Such a system and method would permit users of digital cameras, for example, to create compelling web pages that incorporate digital images they have recorded "on-the-spot" and provide their own textual information for presentation to others on the World Wide Web.

SUMMARY OF THE INVENTION

The invention provides for the creation of web pages on hand-held devices such as PDAs and digital cameras. In general, the invention provides for the downloading of data from a hand-held device (client) while simultaneously, in a one-step operation, substituting user-defined data into templates stored on a larger computer platform (host). A user of the invention will be able to remotely author, on their hand-held device (client), a web page styled according to their own preference.

One aspect of the invention involves the generation of large HTML files on the host computer under control of a compact mapping file that is a generated on a hand-held client computer. The mapping file may be created using a graphic user interface on the hand-held device which allows the user to associate particular ones of a library of templates with text and images, which may be stored on the hand-held device. In a one-step synchronization operation when the hand-held device is connected to a host computer, the mapping file controls the creation of a main HTML file. Specifically, templates referenced in the mapping file are retrieved from host memory and "filled in" with the appropriate information according to the mapping file. Finally, the main HTML file and any source files (e.g. images, audio files) it points to are transferred from the host to the appropriate location on the web server to create the web page.

A primary advantage provided by the invention is that HTML templates (files containing the actual and usually lengthy formatting commands that accomplish the style selected by the user) and other large files needed to create compelling web pages reside on the host computer, not on the hand-held device. Another advantage provided by the invention is that web creation may occur automatically, using a one-step synchronization operation, thereby eliminating the need for a web author to manually orchestrate the transfer of appropriate source files and text. In the case of a digital camera, the invention provides users with the capability to create web page content incorporating digital images stored in the camera and, from a location remote from the host computer, present those images in a compelling format on the World Wide Web. This solution also reduces the amount of data (bandwidth) that needs to be transferred from the hand-held device and the main PC.

BRIEF DESCRIPTION OF THE DRAWINGS

The present invention is illustrated by way of example in the accompanying Figures, which should not be construed as limiting, in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
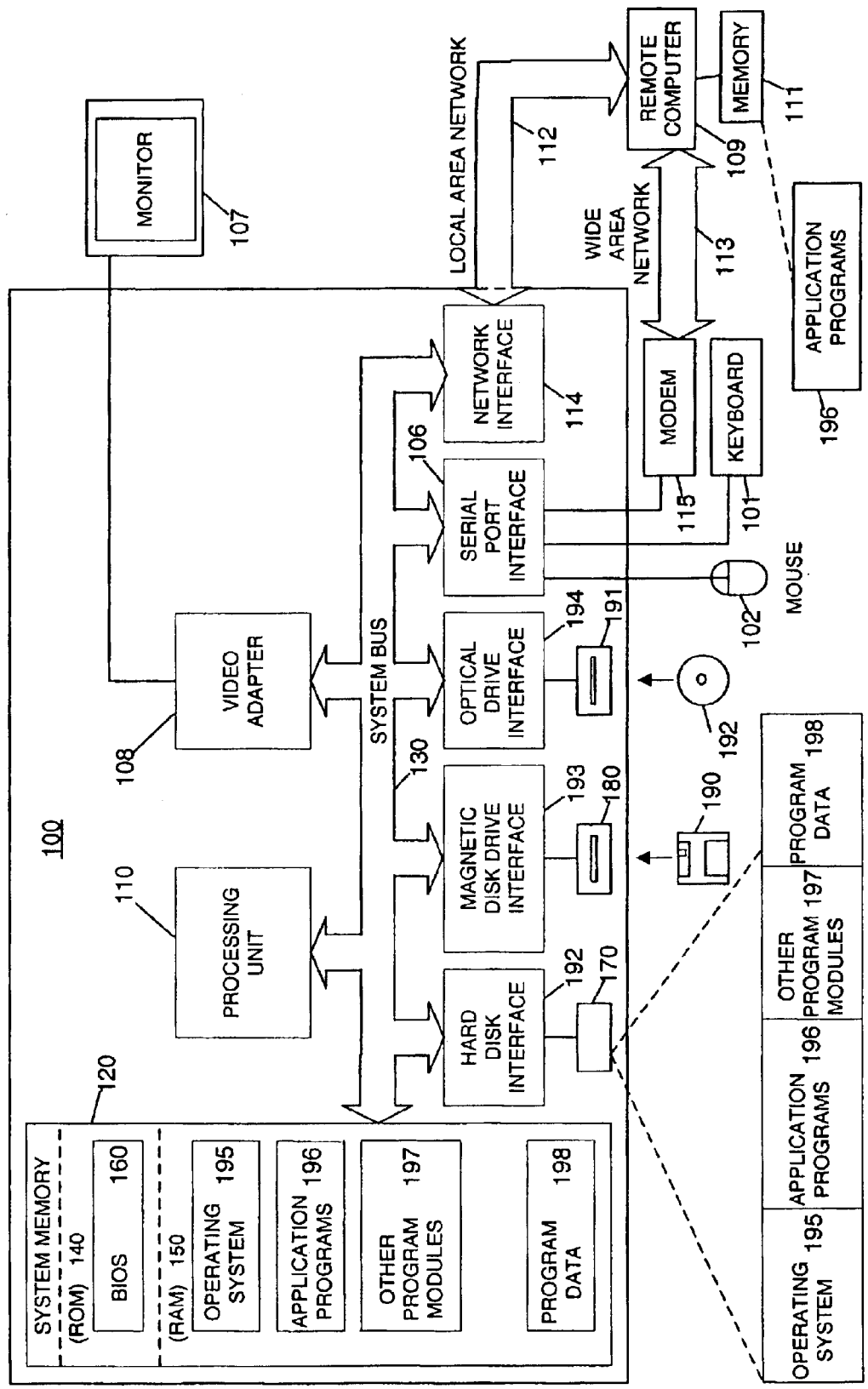
FIG. 1 is a schematic diagram of a conventional general-purpose digital computing environment that may be used to implement various aspects of the present invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109, also referred to as a "client," may be a PDA or digital camera which includes some of the elements described above relative to computer 100, although only a memory storage device 111 has been illustrated in FIG. 1. Typically, in hand-held devices, the monitor 107 would be in the form of a compact liquid crystal display (LCD) and the storage devices, for example, 170 and 191 are omitted in favor of a large internal memory or RAM. Moreover, the user input device, such as the keyboard 101 take the form of a compact keyboard interface or handwriting recognition interfaces. In the case of a digital camera, storage device in the form of a floppy disk drive may be provided. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 6:
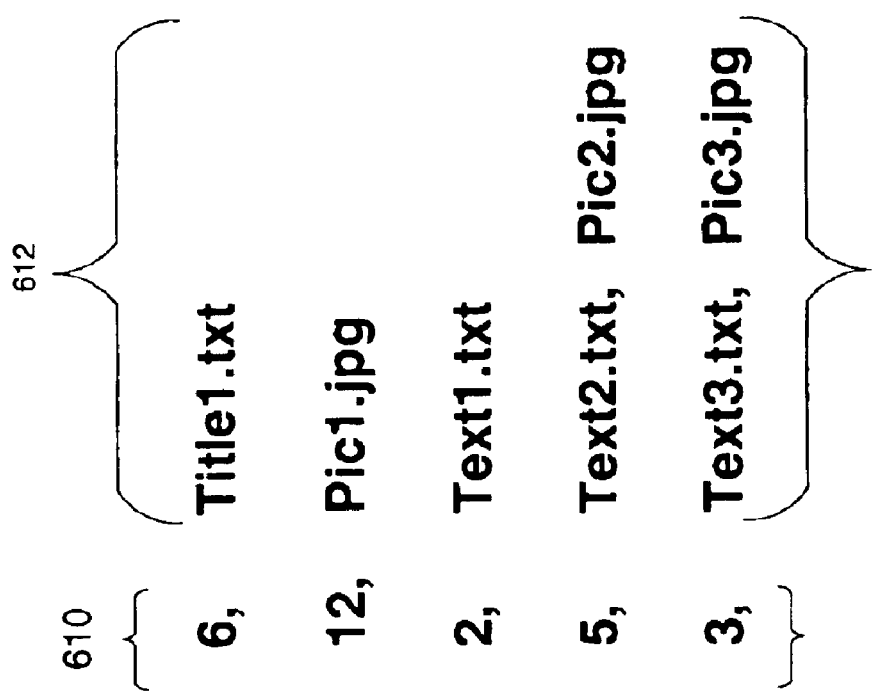
FIG. 6 illustrates an exemplary format for a compact mapping file created on a hand-held device according to the present invention.
Figure 7:
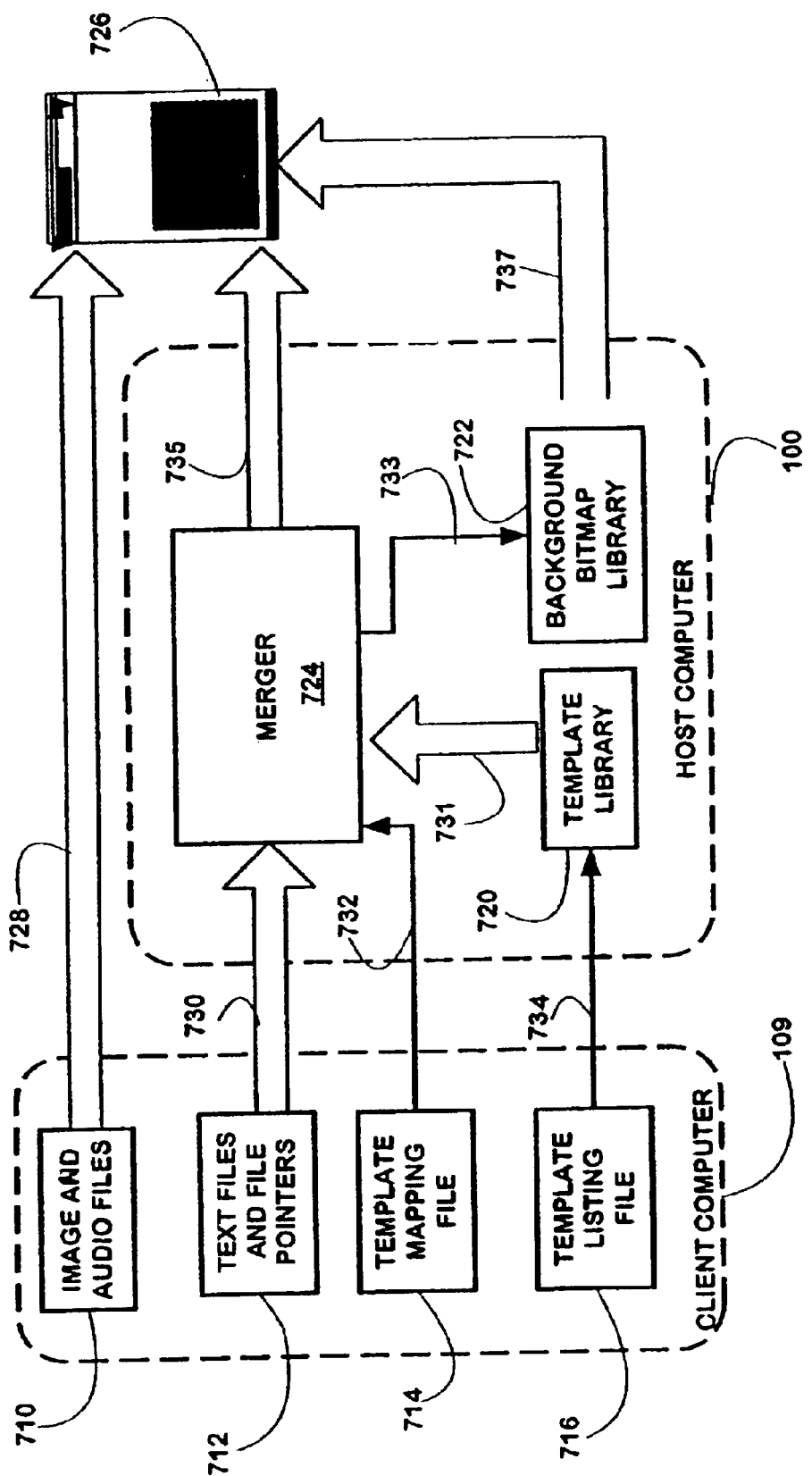
FIG. 7 illustrates an exemplary control flow and file transfer according to the present invention.
Figure 8:
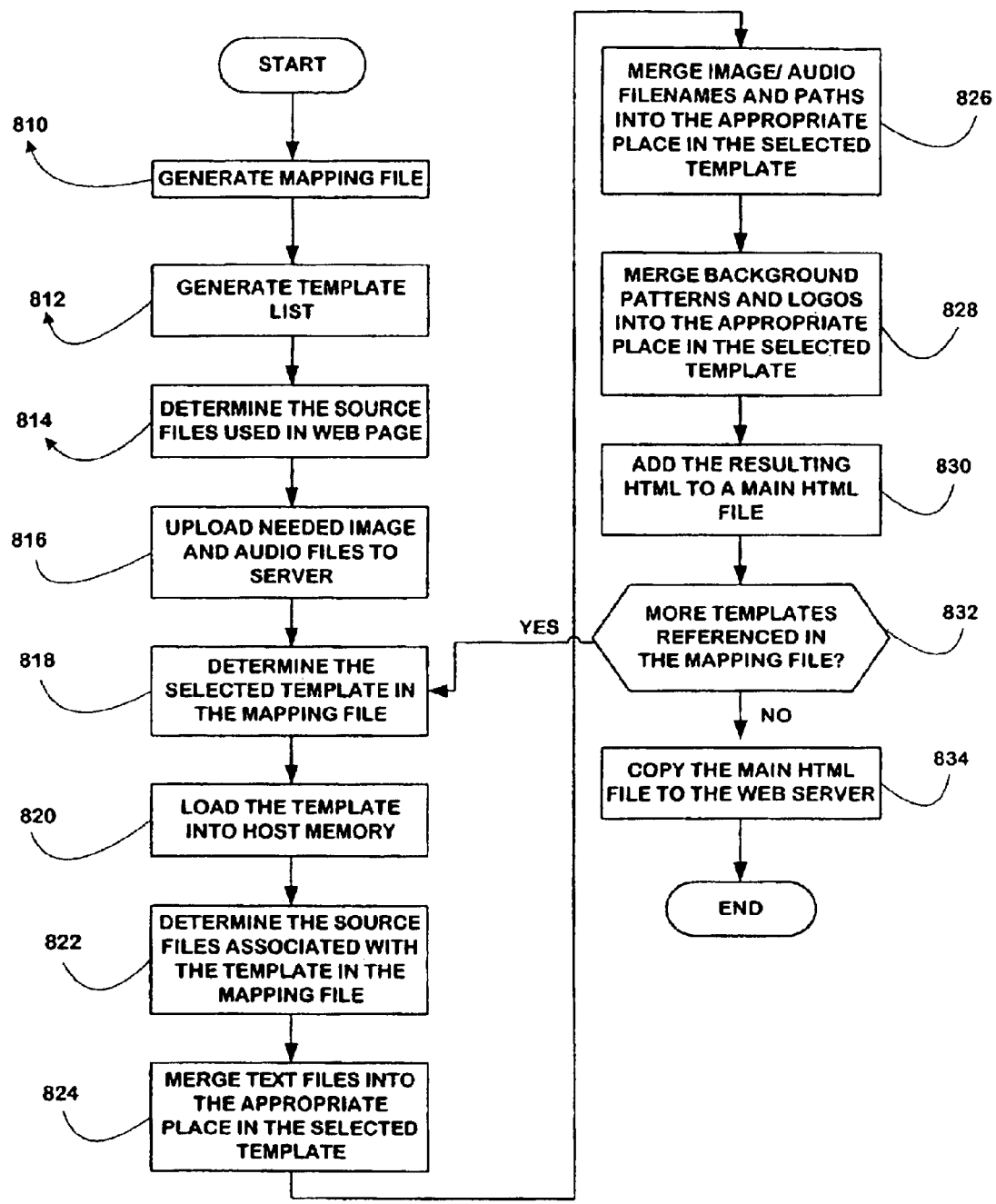
FIG. 8 illustrates an exemplary flow diagram for generating an HTML page layout from a mapping file according to the present invention.

One aspect of the invention provides a method and system for generating web pages based on a compact mapping file created and stored on the hand-held device or remote computer 109. Another aspect of the invention relates to a simplified layout for a web page suitable for implementation on a hand-held device. The simplified HTML layout will first be described with reference to FIGS. 2–5 to illustrate one method of creating a template mapping file according to the invention. With reference to FIGS. 6–8, the method and system for generating a web page according to a template mapping file will then be described. It will be recognized that the simplified layout described below is intended to illustrate one possible method and user interface for creating the mapping file. Other methods of creating the mapping file will be apparent to those of ordinary skill upon a reading of this disclosure.

Figure 2:
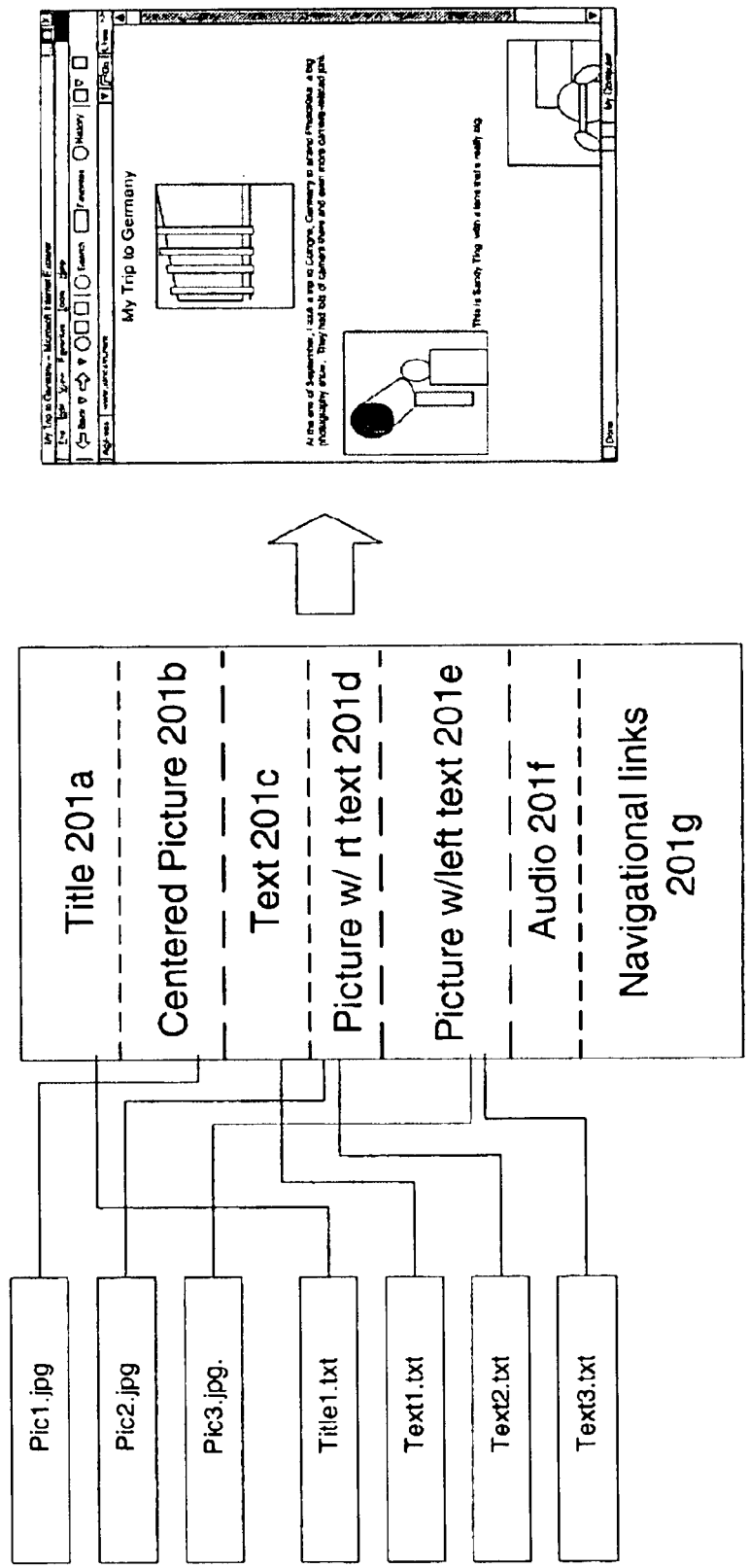
FIG. 2 illustrates an exemplary web page layout for permitting a user to create a web page according to the present invention.

FIG. 2 provides a schematic overview of an exemplary web page layout scheme according to an aspect of the invention. A web page 200 is divided into horizontal rows or regions 201. Each of these horizontal regions 201a–g is associated with a particular style template, selected by a user. Exemplary style templates include templates for titles, text, audio, pictures, parallel column and navigational bars. For example, a title style template may be associated with the top horizontal region 201a. Region 201b may be associated with a style template for presenting a centered image. Region 201c may be associated with a style template for presenting caption text for the centered image above. Each style template includes HTML codes for the particular style of the template and blank spaces for information, such as text or pictures.

One or more source files, which may include text, image, audio or other multimedia files, are also associated with each horizontal region 201, and thus associated with the style template designated for that region. For example, a source file named "Title1.txt" that contains text for a title is associated with region 201a. Similarly, an image file "Pic1.jpg" is associated with region 201b. Style templates can also be associated with more than one source file. For example, the style template assigned to region 201d accepts both an image file and a text file and is therefore associated with text file "Text2.txt" and image file "Pic2.jpg. Similarly, the style template associated with region 201e is associated with text file "Text3.txt" and image file "Pic3.jpg." As represented by regions 201f and 201g, style templates for audio files and navigational links may also be provided. Thus, the simplified page layout according to the invention provides for the association of one or more source files with a selected one of a plurality of style templates.

Figure 3:
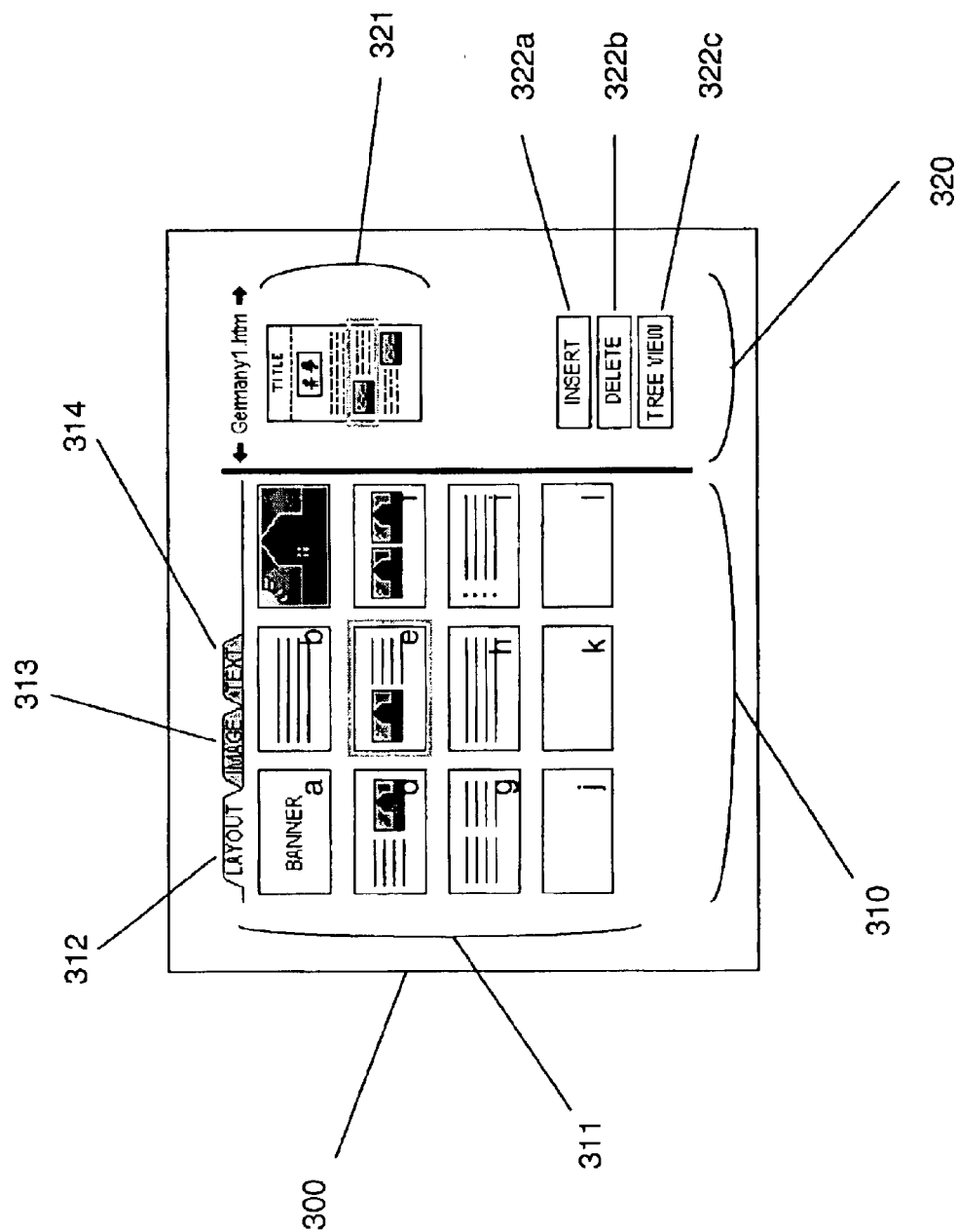
FIG. 3 illustrates an exemplary graphical user interface (GUI) for permitting a user to select style templates for a web page layout according to the present invention.

FIG. 3 shows an exemplary graphical user interface (GUI) 300 for permitting a user to associate selected style templates with one or more source files. GUI 300 may be implemented on a small consumer electronic device having limited memory and display area, such as a Windows® CE-based digital camera or a Windows® CE-based personal digital assistant (PDA). In FIG. 3, GUI 300 is shown divided into two display regions 310 and 320. Display region 310 includes a library of exemplary style icons 311 that are selectable by a user using a user interface selection device, such as a mouse, a trackball, a joystick or other well-known cursor-control/entry-selection device. As shown in FIG. 3, a library of exemplary style icons 311a–311l are displayed when layout tab 312 is selected.

Each style icon 311 is a recognizable graphical image that represents a particular style template. For example, style icon 311a is a graphical image representing a banner or a title style template. Style icon 311b is a graphical image for text-only style template. Style icon 311c is a graphical image for a single photographic or graphical image style template. Style icons 311d–311f represent combinations of textual and/or image style templates. Style icons 311g–311i represent different exemplary textual style templates. Of course, other recognizable icons can be displayed that represent other style templates that are not described.

Display region 320 includes a graphical image 321 representing a current web page that is being created. As different style templates are selected, web page image 321 changes to reflect the relative position of the selected templates. As shown, image 321 includes a title style template at the top of image 321 with a text-only, a picture w/right text and a picture w/left text style templates in order below the title style template. Display region 320 also includes command buttons 322a–322c, which are used for performing selected operations in a well-known manner.

A particular horizontal region 201 (FIG. 2) is laid out by selecting a horizontal portion of image 321 in a well-known manner using the user interface selection device. A particular style for the selected horizontal portion of image 321 is also selected from style icons 311 in a well-known manner using the user interface selection device. Each template includes HTML codes for the particular style of the template and blank spaces for information, such as text or pictures, depending upon the particular style of the template.

Figure 4:
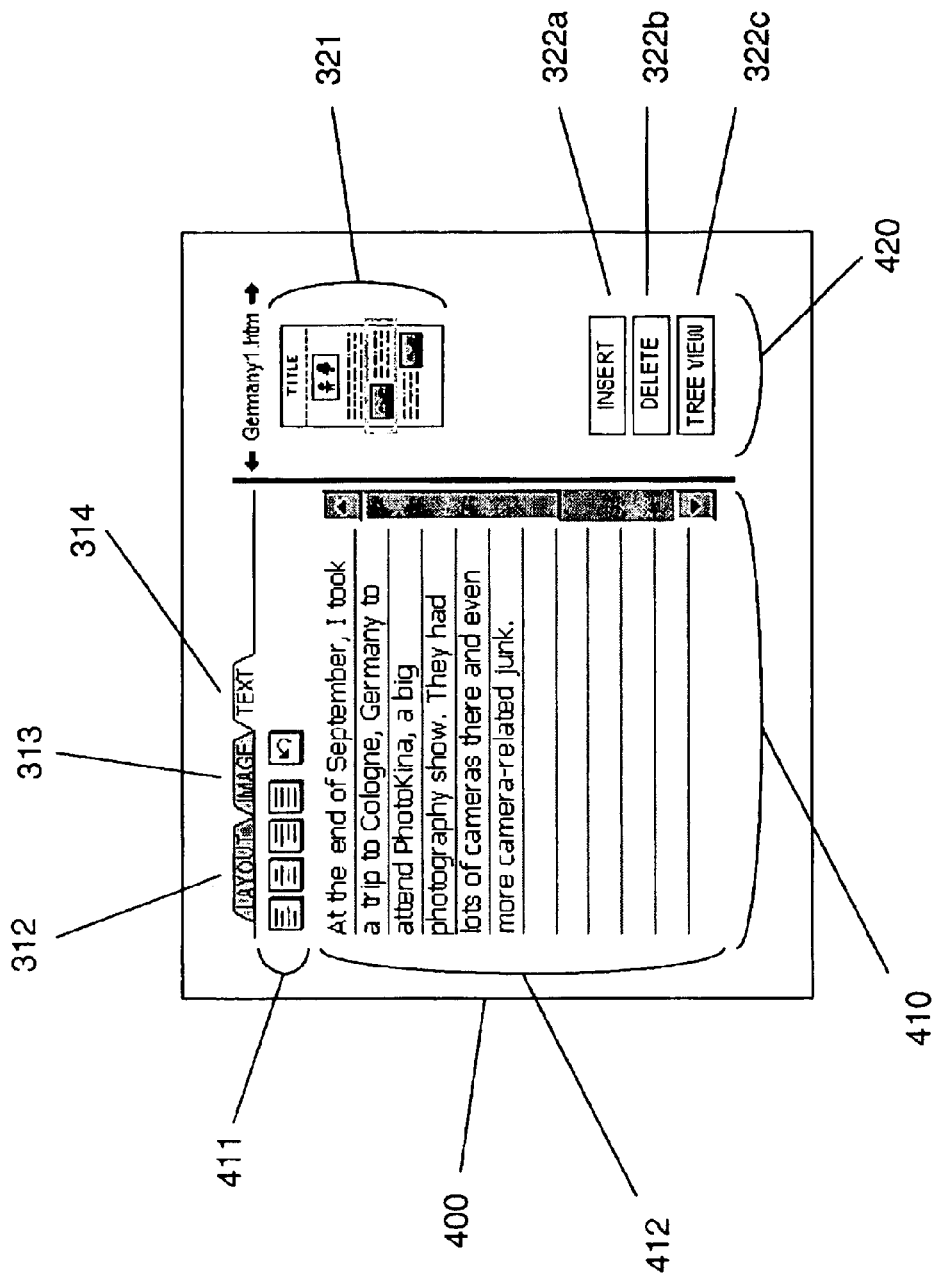
FIG. 4 illustrates an exemplary GUI for permitting a user to enter text into a style template according to the present invention.

When a selected style template includes a blank space for textual information, text tab 314 will be available to permit a user to input text. Text tab displays a library of textual formats, attributes and editing functions, such as centering, paragraphing, margins, fonts, sizes, colors, deletion and undo functions, for the text that is entered into the corresponding blank space. FIG. 4 shows an exemplary GUI 400 for entering textual information into a style template according to the present invention. Like GUI 300 of FIG. 3, GUI 400 is preferably displayed on a small consumer electronic device having limited memory and display area. Alternatively, GUI 400 can be displayed on a personal computer (PC) or a workstation.

In FIG. 4, GUI 400 is shown divided into two display regions 410 and 420. Display region 410 includes a library of exemplary formatting and editing icons 411 that are selectable by a user in a well-known manner using the user interface selection device. As shown in FIG. 4, display region 410 includes a text entry field 412 in which textual information for a particular style template is entered. Alternatively, a pointer to a file containing the desired textual information can be entered. Display region 420 is the same as display region 320 of FIG. 3.

When a selected style template includes a blank space for pictorial or graphical information, image tab 313 is available to display a library of pictorial/graphical formats, attributes and editing functions for the picture or graphical image that is entered into the corresponding blank space. Pictorial/image information can be entered as a pointer to a locally stored image, which is uploaded with the completed page layout, or as a point to a remotely located image that is retrieved and merged with the completed page layout after uploading. Alternatively, when a selected style template does not require text, the text tab 313 may be deactivated, i.e., be appearing faded or otherwise indicated as not available to the user.

Figure 5:
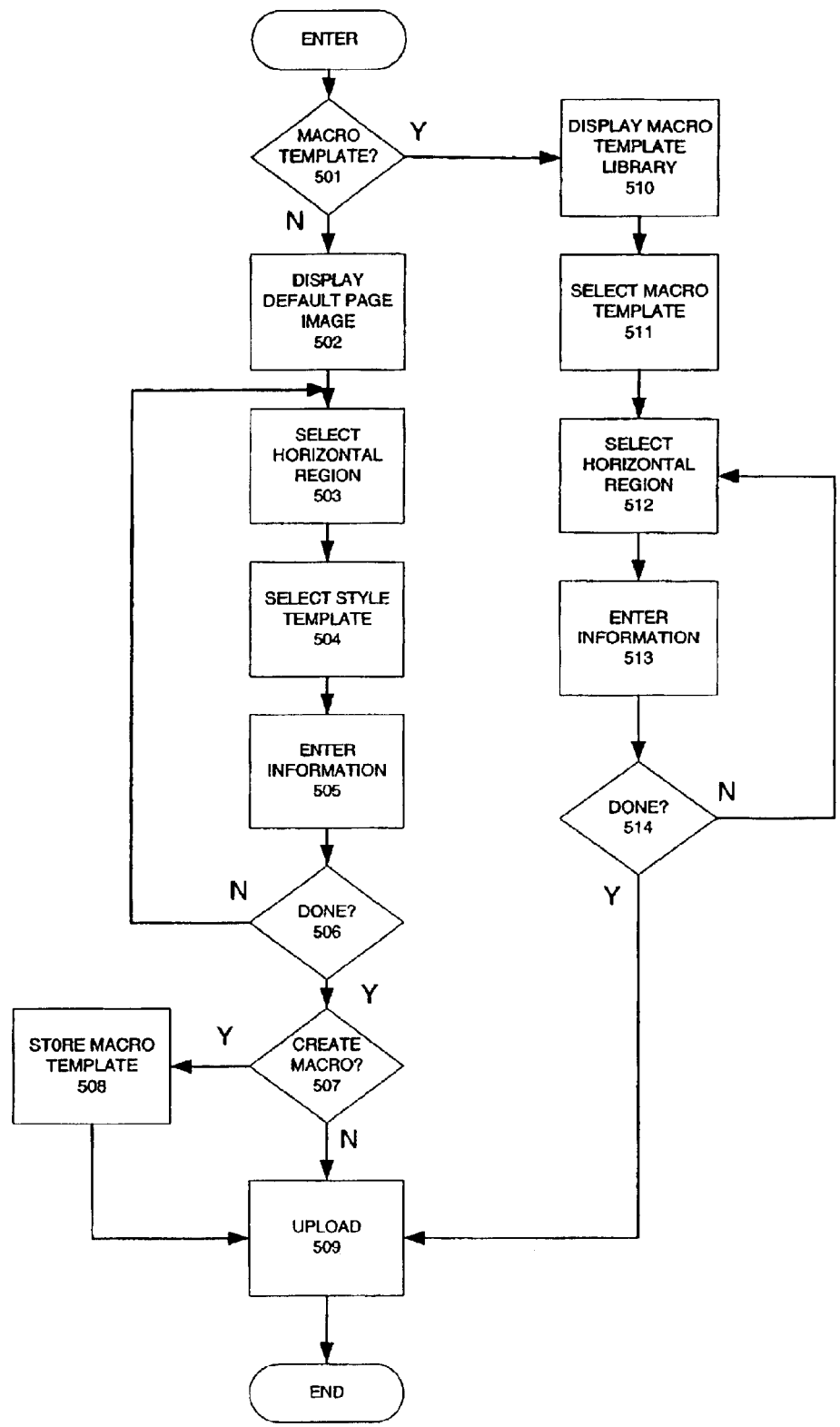
FIG. 5 illustrates an exemplary flow diagram for generating an HTML page layout according to the present invention.

FIG. 5 shows an exemplary flow diagram 500 for generating an HTML page layout according to the present invention. At step 501, it is determined whether a user desires to create a web page layout from a previously stored macro style template or create a new page layout. If a new web page layout is desired, flow continues to step 502 where a library of style templates and a default page layout image (i.e., an icon like icon 321, but is only a page outline) are displayed (FIG. 3). Flow continues to step 503 where a particular horizontal region of the displayed page layout is selected using a user interface selection device. Flow continues to step 504 where a particular style template is selected using the user interface selection device. When the selected style template has a space for entering associated information, such as a title, text and/or an image, flow continues to step 505. When no information is to be associated with the selected style template, step 505 is bypassed and flow continues to step 506.

At step 506, it is determined whether the page layout is complete. If so, flow continues to step 507 where it is determined whether a macro style template for the newly-created page layout should be stored for later use. If so, flow continues to step 508 where the newly-created page layout is stored. If not, flow continues to step 509 where the page layout is uploaded to a server.

If at step 501, a macro style template is desired, flow continues to step 510 where a library of previously stored macro style layouts are displayed. At step 511, a particular macro style layout is selected and a page layout image for the selected macro style template is displayed, similar to FIG. 3. Flow continues to step 512 where a particular horizontal region of the displayed macro style template is selected using the user interface selection device. Flow continues to step 513 where any information associated with the selected horizontal region, such as a title, text and/or an image, is entered. At step 514, it is determined whether the page layout using the selected style template is complete. If so, flow continues to step 509 where the page layout is uploaded to a server.

FIG. 6 illustrates an exemplary format of a template mapping file generated according to the process described above. The template mapping file associates a selected one of a plurality of style templates with one or more source files to be merged into the selected template. This association may be accomplished with the use of delimited pointers, including a style template pointer 610 and one or more source file pointers 612, as shown in FIG. 6, where the delimiter is a comma ",". The first template pointer is designated "6" corresponding to a style selected by the user and associated with a source file, in this case a text file "Title1.txt". Similarly, the second referenced style pointer is designated "12" and is associated with an image file, "Pic1.jpg". Some style sheets may be formatted to be merged with more than one source file, as is the case with the style sheet designated "5" which may be, for example, a style sheet for a right justified image with adjacent text, and is to be merged with two source files: "Text2.txt" and "Pic2.jpg". Those of ordinary skill will recognize that the template mapping file according to the present invention requires only minimal storage because of its compact size and therefore its creation and storage are suitable for implementation on a device with limited memory, such as a hand-held device.

FIG. 7 provides an overview of the control and data flow of an exemplary system and process for generating mark-up language file based on the above-described exemplary mapping file according to the invention. The single line arrows used in FIG. 7 represent the flow of control within the process illustrated, while the wider arrows represent the flow of files or data. Client computer 109, which may be a hand-held device, includes a storage, which may include RAM and magnetic storage components, containing image and audio files 710 generated by the audio and imaging devices of a digital camera, for example. Text files 712 are generated as described above by the user and may comprise, for example, captions that the user inputs in association with the images files 710. Also stored on client computer 109 are the template mapping file 714 and a template listing file 716. Template listing file representing listing of templates used in the template mapping file 714 and is generated using a known procedure by analyzing the template mapping file 714.

Operably connected to the client computer 109, via communications interface is a host computer 100 which includes a storage containing a template library module 720, storing a number of predefined style templates, and a background bitmap library, storing a number of background bitmap patterns. Also residing on the host computer 100 is a merger module 724 in the form of a series of computer-executable instructions stored on a computer readable medium, for execution to accomplish the file transfer and control flow that will be described below. A web server 726 is operably connected to the host computer 100, or alternatively, may be implemented on the host computer 100 with appropriate instructions for accomplishing server functionality.

As may be seen from FIG. 7, the larger files residing on the client computer 109, for example the image and audio files 710, may be transferred directly to the Web server 726 as represented by the file transfer arrow 728. As represented by arrow 730, the text files 712, which may include captions input by the user of the hand-held device, are transferred into memory designated by the merger module 724.

During a synchronization operation, template mapping file 714 controls, as represented by control arrow 732, the merger of the text files 730 or the information representing the image or audio files such as the pointers required for retrieving the source file, in the case of image or audio files, for example, with templates selected from the template library 720 on the host computer 100. As represented by control flow arrow 734, template listing file 716 controls the transfer of templates from template library 720 into a memory associated with merger module 724, the transfer represented by file transfer arrow 731. Thus, each template referenced by the template mapping file 714 is loaded from the template library 720 into the merger module 724, where the appropriate ones of text files 712 and/or the pointers required for retrieving the image and audio files 710 are merged into the loaded template according to mapping information represented in the template mapping file 714. As described, source files in the form of text are merged into a respective template by placing the actual text file contents into the template, whereas source files in the form of image or audio files are merged by inserting the pointer, i.e., filename and path, into the template such that the web server may determine where to retrieve the image or audio file. The process results in a series of "filled-in" templates, which are concatenated to form a main HTML stream that is transferred to the web server as represented by file arrow 735.

The HTML formatting codes being merged in merger module 724 may contain references to background bitmap images stored in the background bitmap image library 722. As represented by control flow arrow 733, the merger module 724 controls the transfer of referenced background bitmaps from the background bitmap library 722 to the web server 726 as represented by file transfer arrow 737.

It will be recognized that a key aspect of the invention is the control of the merger module using the template mapping file 714, which may reside on the client computer throughout the generation of the HTML stream. In that case, while the hand-held device is operably coupled to the host computer, the hand-held device generates signals representing the template mapping file 714, stored in the hand-held device, to control the host computer to effectuate merger of data representing the source file or files, text files or pointers to image or audio files, with the selected template or templates. Alternatively, the template mapping file 714 may itself be transferred from the client computer to the host computer prior to controlling the merger operation and used by the host computer to perform a merger operation. Similarly, the template listing file does not necessarily have to be transferred or uploaded to the host computer 100 since control, as represented by arrow 734, and the merging operation may occur while template listing file 716 resides on the client computer 109, operably connected to the host computer 100.

Referring additionally to FIG. 8, the steps of an exemplary process associated with the control and file transfer described above with reference to FIG. 7, are illustrated in a flow diagram. At step 810, the mapping file is generated according to the procedure outlined above with reference to FIGS. 2–6. After the mapping file is generated in step 810, the system generates a template list at step 812. Here, the templates used in the mapping file are generated and stored on the client computer. The system then proceeds to step 814 where the source files used in the Web page are determined. At step 816, the system uploads any needed image and audio files to the Web server.

Generation of the HTML file to create the Web page begins at step 818. Here, the process determines which template appears first in the template mapping file. The process then performs step 820 where the merger module 724 loads the referenced template into memory. Merger module 724 then receives control commands from the template mapping file 714 to determine which source files have been associated with the referenced template. Referring back to FIG. 6, for example, the template pointer "6" is associated with the file pointer "Title1.txt". In this case, the merger module 724 will load in the template associated in with the style template pointer "6" into the merger module and will merge the text stored in file "Title1.txt" into the template. Merging of the source file may occur are using regular expression mapping, wherein a generic operator embedded in the HTML formatting codes is replaced with the actual text stored in the source file.

At steps 822, the source files associated with the template are determined. In the case of source files in the form of text, the actual text is merged into the template at step 824. In the case of source files in the form of -image and audio files, a file pointer including the filename and path are merged into the template at step 826. At step 828, background patterns and logos are merged in the appropriate place in the selected template. At step 830, the HTML string resulting from the merger of the selected template with the appropriate source filed is added to a main HTML file.

At step 832, the merger module 724 determines if more templates are referenced in the mapping file. This may be accomplished by the use of a delimiting character in the mapping file itself to determine when the end file has been reached. If more templates are determined to be represent mapping file, the system returns to step 818 where the next template referenced in the mapping file is determined. Again, at step 820 the next template referenced in the template mapping file is loaded into host memory by the merger module 724 and the appropriate source files are merged with the template. The process thus continues until the end of the mapping file is reached and at steps 834, the main HTML stream is copied to the web server. Those of ordinary skill the art will recognize that step 816 where the image and audio files are uploaded to the server need not occur before the merger steps 818 through 832, but may occur after or simultaneously with those steps in a synchronization operation.

Although the invention has been described above, it should be appreciated that a variety of modifications will be readily available to persons utilizing the invention. The foregoing description is not intended to be limiting, but is merely illustrative of an exemplary adaptation of the invention. Other products, apparatus and methods which incorporate modifications or changes to that which has been described herein are equally included within this application.

What is claimed is:

1. A method of generating a web page comprising:
   receiving, as an input to a hand-held device, a selection of a template;
   associating a source file with the selected template to create a template mapping file, wherein the template mapping file does not include mark-up language codes;
   transmitting, from the hand-held device, to a host computer external to the hand-held device, the template mapping file and information representing the source file;
   generating a file representing a formatted web page at the host computer based on the template mapping file and the information representing the source file.

2. The method of claim 1, wherein the source file includes an image file input from a digital camera.

3. The method of claim 1, wherein the source file includes voice data.

4. The method of claim 1, wherein the source file includes text data.

5. The method of claim 1, wherein the information representing a source file includes a filename and a path associated with the source file.

6. The method of claim 1, wherein the template mapping file includes a filename and a path associated with the source file, associated with the selected template.

7. The method of claim 1, further comprising receiving a template listing file which lists the user selection of the template in the template mapping file.

8. The method of claim 1, further comprising the step of uploading the source file to a web server.

9. The method of claim 1, wherein the step of generating a file representing a formatted web page includes the step of merging the information representing the source file into the selected template.

10. The method of claim 1, wherein the step of generating a file representing a formatted web page includes merging the information representing the source file into the selected template to create a mark-up language file.

11. The method of claim 1, wherein the file representing a formatted web page is transferred to a web server.

12. In a computer, a method of generating a web page using a hand-held device comprising:
   receiving from a hand-held device external to the computer a template mapping file associating information representing a source file with a user selection of a template, wherein the template mapping file identifies the selected template;
   merging the information representing the source file with the selected template in accordance with the template mapping file to generate a file representing a formatted web page.

13. The method of claim 12, wherein the source file includes an image file input from a digital camera.

14. The method of claim 12, wherein the source file includes voice data.

15. The method of claim 12, wherein the source file includes text data.

16. The method of claim 12, wherein the information representing a source file includes a filename and a path associated with the source file.

17. The method of claim 12, wherein the template mapping file includes a filename and a path associated with the source file, associated with the selected template.

18. The method of claim 12, further comprising receiving a template listing file which lists the user selection of the template in the template mapping file.

19. The method of claim 12, further comprising the step of uploading the source file to a web server.

20. The method of claim 12, wherein the file representing a formatted web page is a mark-up language file.

21. The method of claim 12, wherein the file representing a formatted web page is transferred to a web server.

22. An apparatus for generating a web page comprising:
an interface that receives, from a hand-held device external to the apparatus, information representing a source file, and a template mapping file associating the information representing the source file with the information identifying a template, wherein the template mapping file does not include mark-up language codes;
a merger unit including a memory that merges the information representing a source file with the template in accordance with the template mapping file to generate a file representing a formatted web page.

23. The apparatus of claim 22, wherein the source file includes an image file input from a digital camera.

24. The apparatus of claim 22, wherein the source file includes voice data.

25. The apparatus of claim 22, wherein the source file includes text data.

26. The apparatus of claim 22, wherein the information representing the source file includes a filename and a path associated with the source file.

27. The apparatus of claim 22, wherein the template mapping file includes a filename and a path associated with the source file, associated with the template.

28. The apparatus of claim 22, the interface further receiving a template listing file which lists the user selection of the template in the template mapping file.

29. The apparatus of claim 22, further comprising a template library for storing at least one template including mark-up language formatting commands.

30. The apparatus of claim 22, wherein the merger unit merges the information representing the source file into the template.

31. The apparatus of claim 22, wherein the merger unit merges the information representing the source file into the template to create a mark-up language file.

32. The apparatus of claim 22, further including a communication unit wherein the file representing a formatted web page is transferred to a web server.

33. A hand-hand device for generating a web page comprising:
a user input for selecting a template from a plurality of templates stored in a memory;
a source selection unit for selecting a source file;
a processor processing user inputs and source selections and associating information representing the source file with the selected template and generating a template mapping file, wherein the template mapping file identifies a selected template;
a transmitter for transmitting the information representing the source file and the template mapping file, to a host computer external to the hand-held device for merging the information representing the source file with the selected template in accordance with the template mapping file to produce a file representing a formatted web page.

34. The apparatus of claim 33, wherein the source file includes an image file input from a digital camera.

35. The apparatus of claim 33, wherein the source file includes voice data.

36. The apparatus of claim 33, wherein the source file includes text data.

37. The apparatus of claim 33, wherein the information representing the source file includes a filename and a path associated with the source file.

38. The apparatus of claim 33, wherein the template mapping file includes a filename and a path associated with the source file, associated with the selected template.

39. The apparatus of claim 33, the processor further generating a template listing file which lists the user selection of the template in the template mapping file for transmission to the host computer.

40. The apparatus of claim 33, wherein the host computer merges the information representing the source file into the selected template.

41. The apparatus of claim 33, wherein the host computer merges the information representing the source file into the selected template to create a mark-up language file.

42. A computer-readable medium having computer-executable modules for operation by a computer comprising:
a template library module for storing at least one template including web-based formatting commands;
a source file receiving module for receiving information representing a source file from a hand-held device external to the computer;
a merger module for creating a file representing a formatted web page by merging the information representing the source file with the at least one template in accordance with a template mapping file to generate a file representing a formatted web page, wherein the template mapping file does not include mark-up language codes.

43. The computer-readable medium of claim 42, wherein the merger module is controlled by the template mapping file on the computer.

44. The computer-readable medium of claim 42, wherein the template mapping file maps the source file to a target position in the at least one template.

45. The computer-readable medium of claim 42, wherein the merger module merges the template with the at least one source file using regular expression mapping.

46. A method of generating a web page comprising:
receiving, as an input to a hand-held device, a selection of a template;
associating a source file with the selected template to create a template mapping file, wherein the template mapping file identifies the selected template;
operably connecting the hand-held device to a host computer;
transmitting, from the hand-held device, to the host computer external to the hand-held device, information representing the source file;

generating, at the host computer, while the hand-held device is coupled to the host computer, a file representing a formatted web page, based on the information representing the source file, and based on information corresponding to the template mapping file received from the hand-held device while the hand-held device is coupled to the host computer.

47. The method of claim 46, wherein the source file includes an image file input from a digital camera.

48. The method of claim 46, wherein the source file includes voice data.

49. The method of claim 46, wherein the source file includes text data.

50. The method of claim 46, wherein the information representing the source file includes a filename and a path associated with the source file.

51. The method of claim 46, wherein the template mapping file includes a filename and a path associated with the source file, associated with the selected template.

52. The method of claim 46, further comprising receiving a template listing file which lists templates in the template mapping file.

53. The method of claim 46, further comprising the step of uploading the source file to a web server.

54. The method of claim 46, wherein the step of generating a file representing a formatted web page includes the step of merging the information representing the source file into the selected template.

55. The method of claim 46, wherein the step of generating a file representing a formatted web page includes merging the information representing the source file into the selected template to create a mark-up language file.

56. The method of claim 46, wherein the file representing a formatted web page is transferred to a web server.

57. A method of generating a web page comprising:

receiving, as an input to a hand-held device, a selection of a template;

associating a source file with the template to create a template mapping file, wherein the template mapping file does not include mark-up language codes;

transmitting, from the hand-held device, to a host computer, the template mapping file and information representing the source file;

generating a file representing a formatted web page at the host computer based on the template mapping file and the information representing the source file, wherein the source file includes voice data.

* * * * *